United States Patent
Han et al.

(10) Patent No.: US 11,419,054 B2
(45) Date of Patent: Aug. 16, 2022

(54) ENERGY SAVINGS ON MULTIHOMED MOBILE DEVICES USING A DYNAMICALLY ADJUSTED INACTIVITY TIMER

(71) Applicant: AT&T Intellectual Property I, L.P., Atlanta, GA (US)

(72) Inventors: Bo Han, Bridgewater, NJ (US); Shuai Hao, Hillsborough, NJ (US); Lusheng Ji, Randolph, NJ (US); Feng Qian, Bloomington, IN (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1007 days.

(21) Appl. No.: 14/802,508

(22) Filed: Jul. 17, 2015

(65) Prior Publication Data
US 2017/0019857 A1 Jan. 19, 2017

(51) Int. Cl.
*H04W 52/02* (2009.01)
*H04W 88/06* (2009.01)

(52) U.S. Cl.
CPC ..... *H04W 52/0251* (2013.01); *H04W 52/028* (2013.01); *H04W 52/0212* (2013.01); *H04W 52/0254* (2013.01); *H04W 88/06* (2013.01); *Y02D 30/70* (2020.08)

(58) Field of Classification Search
None
See application file for complete search history.

(56) References Cited

U.S. PATENT DOCUMENTS

| 8,400,923 | B2* | 3/2013 | Kini | H04L 45/24 370/235 |
| 8,437,810 | B2 | 5/2013 | Hussain | |
| 8,467,789 | B2 | 6/2013 | Ganesan | |
| 8,565,169 | B2 | 10/2013 | Tavildar et al. | |
| 8,972,572 | B2 | 3/2015 | Gerber et al. | |
| 9,025,579 | B2 | 5/2015 | Kwon et al. | |
| 9,270,347 | B2* | 2/2016 | Fong | H04B 7/024 |
| 2007/0060126 | A1* | 3/2007 | Taniguchi | H04W 36/32 455/436 |

(Continued)

OTHER PUBLICATIONS

Athivarapu, Pavan K. et al., "Radio-Jockey: Mining Program Execution to Optimize Cellular Radio Usage," In Proceedings of MOBICOM 2012, pp. 101-112, Aug. 2012.

(Continued)

*Primary Examiner* — Kenny S Lin
(74) *Attorney, Agent, or Firm* — Amin, Turocy & Watson, LLP

(57) ABSTRACT

Energy consumption of cellular interfaces on multihomed mobile devices, such as smartphones, tablets and laptops can be improved by adjusting the inactivity timer of the cellular interface of the mobile devices based on the on/off status of non-cellular interface(s) on the mobile devices. Possible near-future data packets can be transmitted or received on the non-cellular interfaces that co-exist on the mobile devices and thus the inactivity timer of the cellular interface may be dynamically and more efficiently adjusted, based on the on/off status of non-cellular interface(s). If the non-cellular interface is available on the mobile device, then the inactivity timer can be set to be shorter than if only the cellular interface is available.

18 Claims, 6 Drawing Sheets

(56) References Cited

U.S. PATENT DOCUMENTS

| | | | |
|---|---|---|---|
| 2010/0067422 A1 | 3/2010 | Kadous et al. | |
| 2010/0172275 A1 | 7/2010 | Wu et al. | |
| 2012/0252432 A1* | 10/2012 | Henttonen | H04W 24/10 455/422.1 |
| 2013/0329615 A1 | 12/2013 | Vyas et al. | |
| 2014/0082697 A1* | 3/2014 | Watfa | H04W 76/025 726/3 |
| 2014/0160937 A1 | 6/2014 | Richards | |
| 2014/0199994 A1 | 7/2014 | Richards | |
| 2014/0323180 A1 | 10/2014 | Uusitalo et al. | |
| 2014/0364174 A1 | 12/2014 | Vyas et al. | |
| 2015/0126257 A1 | 5/2015 | Kim et al. | |
| 2015/0215225 A1* | 7/2015 | Mildh | H04L 69/14 370/236 |
| 2016/0050709 A1* | 2/2016 | Bergstrom | H04W 76/026 455/450 |
| 2016/0088671 A1* | 3/2016 | Bergstrom | H04W 76/045 370/338 |
| 2016/0143085 A1* | 5/2016 | Cai | H04W 52/0235 370/311 |
| 2016/0198364 A1* | 7/2016 | Schwarzbauer | H04W 28/08 370/331 |
| 2017/0118787 A1* | 4/2017 | Kekki | H04W 76/025 |
| 2017/0223698 A1* | 8/2017 | Niu | H04W 28/08 |

OTHER PUBLICATIONS

Balasubramanian, N. et al. "Energy Consumption in Mobile Phones: A Measurement Study and Implications for Network Applications," University of Massachusetts Amherst, Department of Computer Science, Nov. 4-6, 2009, pp. 280-293.

Deng, Shuo and Balakrishnan, Hari, "Traffic-Aware Techniques to Reduce 3G/LTE Wireless Energy Consumption," In Proceedings of CoNEXT 2012, pp. 181-192, Dec. 2012.

Nicutar, C. et al. "Using Cooperation for Low Power Low Latency Cellular Connectivity," University of Politehnica of Bucharest, Department of Computer Science, Aug. 14, 2012, 12 pages.

Xiao, Yu, "Modeling and Managing Energy Consumption of Mobile Deivices," Department of Computer Science and Engineering, Aalto University, Doctoral Dissertations, Dec. 20, 2011, 74 pages.

Advanced LTE, "Universal Mobile Telecommunications System (UMS); LTE; 3GPP system to Wireless Local Area Network (WLAN) interworking; System description (3GPP TS 23.234 version 11.0.0 Release 11)", European Telecommunications Standards Institute, Sep. 2012, 86 pages.

* cited by examiner

ENERGY SAVINGS ON MULTIHOMED MOBILE DEVICES USING A DYNAMICALLY ADJUSTED INACTIVITY TIMER

BACKGROUND

Field of the Invention

This invention relates to power savings in mobile devices and more particularly to power savings in mobile devices with two or more communication interfaces.

Description of the Related Art

It is well-known that the energy consumption of a cellular radio by user equipment (UE) is not proportional to the amount of transmitted or received data, due to the intrinsic design nature of the cellular radio access procedure. As used herein UE refers to any mobile device such as a phone, laptop, tablet, car, or any other device having a cellular radio. Previous work has shown that around 60% of the energy consumed by a 3G UE is not due to the transmitting or receiving of data packets, but mainly due to the Radio Resource Control (RRC) state transitions. The 3rd Generation Partnership Project (3GPP) RRC protocol defines several states with different power levels that a cellular radio interface switches between, depending on the amount and distribution of carried data traffic. In a 3G network, these states include, in the order of decreasing power levels, CELL_DCH (Dedicated Channel), CELL_FACH (Forward Access Channel) and IDLE. A 4G Long Term Evolution (LTE) network has only two RRC states, RRC_CONNECTED and RRC_IDLE.

These state transitions are not instantaneous, incurring both energy and signaling overhead. As shown in FIG. 1, for a 4G LTE network, at the beginning of a data burst, a UE wakes up from the low power RRC_IDLE state 101 and transitions to the high power RRC_CONNECTED state 103 to transfer data packets. The LTE base station (i.e., eNodeB) maintains an inactivity timer for every UE. After the communication burst ends, the UE remains in the RRC_CONNECTED state 103 for a certain period of time controlled by the inactivity timer, typically around 10 to 20 seconds, before transitioning back to the RRC_IDLE state 101. That inactive time period is usually referred to as the radio tail. The state transition from RRC_IDLE to RRC_CONNECTED may take up to 2 seconds, because it requires authentication and the RRC connection to be established, involving signaling message exchange with different entities in both radio access networks and cellular core networks. Therefore, the radio tail may avoid the repeated RRC connection setups during the state transitions from RRC_IDLE to RRC_CONNECTED and the associated signaling overhead for possible near-future data packets. However, the radio tail also has a major implication on the energy consumption of applications running in background, due to the wasted energy consumption spent during the radio tail. Those applications typically exchange short bursts of data packets with remote servers, such as pulling news feeds, checking for incoming emails and periodically sending heart-beat messages to maintain data connections.

The state transitions are more complicated for 3G networks, as shown in FIG. 2. The UE transitions from the IDLE state 201 to CELL_DCH state 203 when there are data packets to be transmitted or received. A 3G base station maintains two inactivity timers for every UE, $t_{-1}$ and $t_{-2}$. For a UE in the CELL_DCH state, if it has no data packet in either uplink or downlink for $t_{-1}$ seconds, it will switch from CELL_DCH to CELL_FACH 205, an intermediate state whose power level is lower than the CELL_DCH state, but still much higher than the IDLE state. If there is no further data packet from or to the UE for another $t_{-2}$ seconds, it enters into the IDLE state. The state transition from CELL_FACH to CELL_DCH is also triggered by data packets either from or to the UE. Other RRC states for 3G networks include CELL_PCH (Paging Channel) and URA_PCH, which are mainly used for paging purpose.

Recent work has addressed the radio-tail problem through either program-execution mining or traffic-pattern learning. For example, one approach learns application-level signatures that can predict network-level behavior through a decision tree classifier, by automatically identifying program features (e.g., function or system calls and stack traces) that only appear close to the end of communication spurts. MakeIdle/MakeActive predicts network activities (e.g., when a traffic burst starts or ends) through complicated statistical machine learning techniques, by building a conditional probability distribution of network activity. Note that the inactivity timer chosen by either data mining or machine learning technologies may not always be proper. Moreover, both approaches use fast dormancy, a mechanism that changes the inactivity timer through additional signaling message exchange, which is no longer supported in 4G LTE networks. Accordingly, improvements related to effective use of radio tails is desirable.

SUMMARY OF EMBODIMENTS OF THE INVENTION

Accordingly, in one embodiment a method includes setting an inactivity timer for a mobile device having a cellular radio interface and a non-cellular radio interface based on a status of the non-cellular radio interface in the mobile device. The method may further include a base station setting the inactivity timer to a first value responsive to the status of the non-cellular radio interface indicating the non-cellular radio interface is turned off and the base station setting the inactivity timer to a second value, smaller than the first value, responsive to the status of the non-cellular radio interface indicating the non-cellular radio interface is turned on.

In another embodiment an apparatus includes an inactivity timer for a mobile device. Control logic responds to a status of a non-cellular radio interface in a mobile device having a cellular radio interface and the non-cellular radio interface, to set the inactivity timer for the mobile device to a first value in response to the status of the non-cellular radio interface indicating the non-cellular radio interface is turned off. The control logic sets the inactivity timer to a second value, smaller than the first value, responsive to the status of the non-cellular radio interface indicating the non-cellular radio interface is turned on.

In another embodiment a system includes a base station. The base station includes an inactivity timer for a mobile device. The base station further includes control logic responsive to a status of a non-cellular radio interface in the mobile device having a cellular radio interface and the non-cellular radio interface. The control logic sets the inactivity timer for the mobile device to a first value responsive to the status of the non-cellular radio interface indicating the non-cellular radio interface is turned off and the control logic sets the inactivity timer to a second value, smaller than the first value, responsive to the status of the non-cellular radio interface is turned on. The control logic is responsive to a change in the status of the non-cellular radio interface to set the inactivity timer to the first value from the second value if the change indicates the non-cellular radio interface has been turned off and the control logic is responsive to the change in the status of the non-cellular radio interface indicating the non-cellular radio interface has been turned on to set the inactivity timer to the second value.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Mobile devices with multiple communication interfaces have become commonplace. Usually users prefer to use only one of the interfaces (cellular, WLAN, or Bluetooth) for data communications, depending on application requirements and network conditions. However, given the increasing traffic demand, especially for high definition video and audio, and the requirement for better quality of user experience, multiple communication interfaces on a single mobile device are increasingly used together for information/content retrieval. Moreover, the recently developed MultiPath TCP (MPTCP) protocol leverages multiple interfaces on a single device for higher throughput and data session continuity during mobility. The co-existence of non-cellular interfaces offers a unique opportunity to reduce the energy consumption of cellular interfaces. Embodiments described herein initially set the inactivity timer of a cellular radio interface by leveraging the availability of other interfaces that co-exist on a mobile device, if they are turned on. In addition, the inactivity timer can be dynamically changed in response to changing conditions of the non-cellular radio interface. Thus, energy consumption of cellular interfaces on multihomed mobile devices can be reduced.

The system can leverage the fact that possible near-future data packets can be transmitted or received on non-cellular interfaces that co-exist on a mobile device, thus allowing shortening the radio tail designed for the possible near-future data packets. The inactivity timer of the cellular interface can be more efficiently set and dynamically adjusted to reflect the availability of the non-cellular interface(s). That contrasts to the original 3GPP protocol design, which considers only cellular interfaces in isolation. If the possible near-future data packets belong to the same TCP connection as those previous packets, MPTCP can be leveraged to hide the path change from upper layer applications. While the description herein focuses on 4G LTE networks, the approach can also be easily applied to 3G networks and other networks where a radio tail may be employed.

Figure 1:
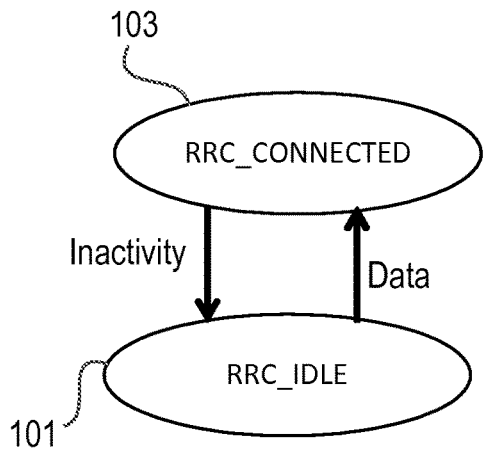
FIG. 1 illustrates state transitions between the idle and connected states for a 4G LTE network.
Figure 2:
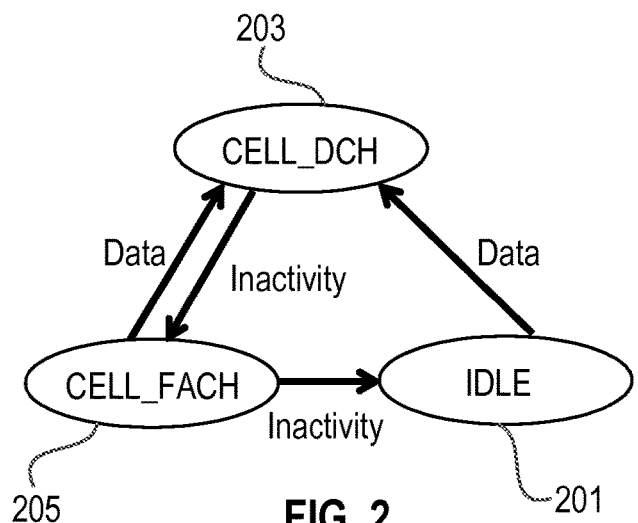
FIG. 2 illustrates state transitions for a 3G network.
Figure 3:
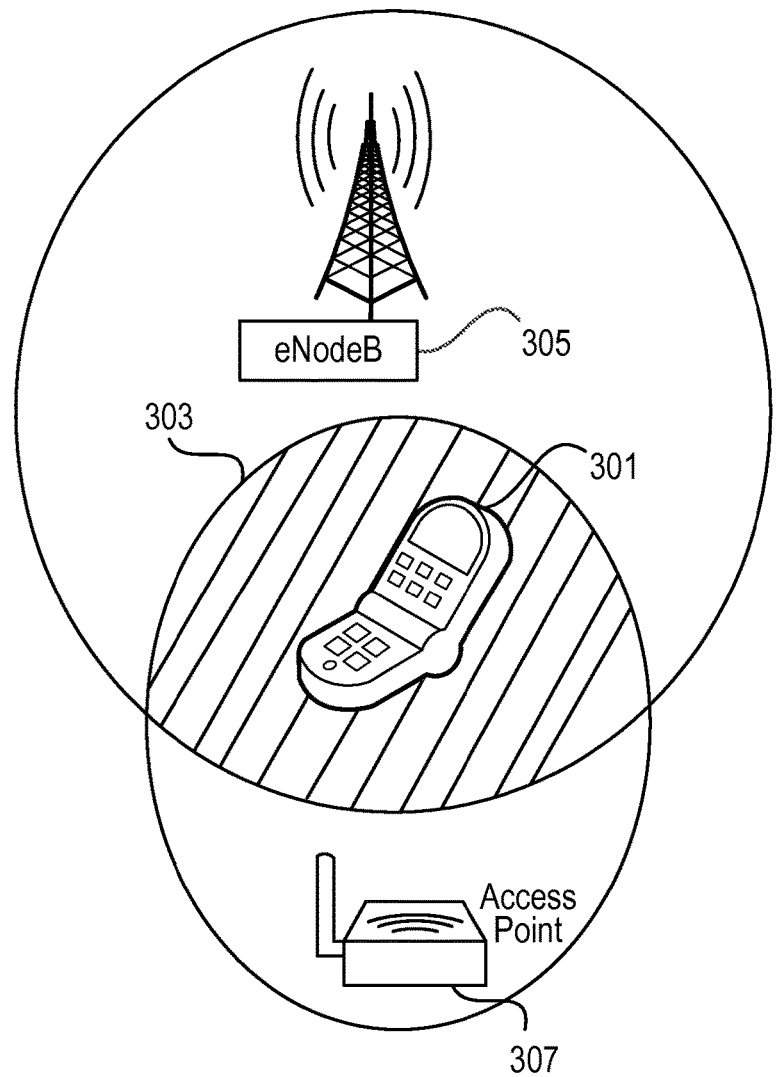
FIG. 3 illustrates an example in which embodiments described herein may be utilized where a mobile device is in an overlapping coverage area covered by an LTE base station (eNodeB) and a WLAN access point.

FIG. 3 illustrates an example where a mobile device 301 is in an overlapping coverage area 303 covered by an LTE base station 305 and a WLAN access point 307 such as an access point implementing IEEE 802.11n or IEEE 802.11ac, or a similar wireless local area network (WLAN). Mobile device 301 includes a cellular radio interface for communicating with LTE base station 305 and a WLAN radio interface for communicating with access point 307. For ease of reference, the non cellular radio interface will be referred to as a WLAN interface.

Figure 4:
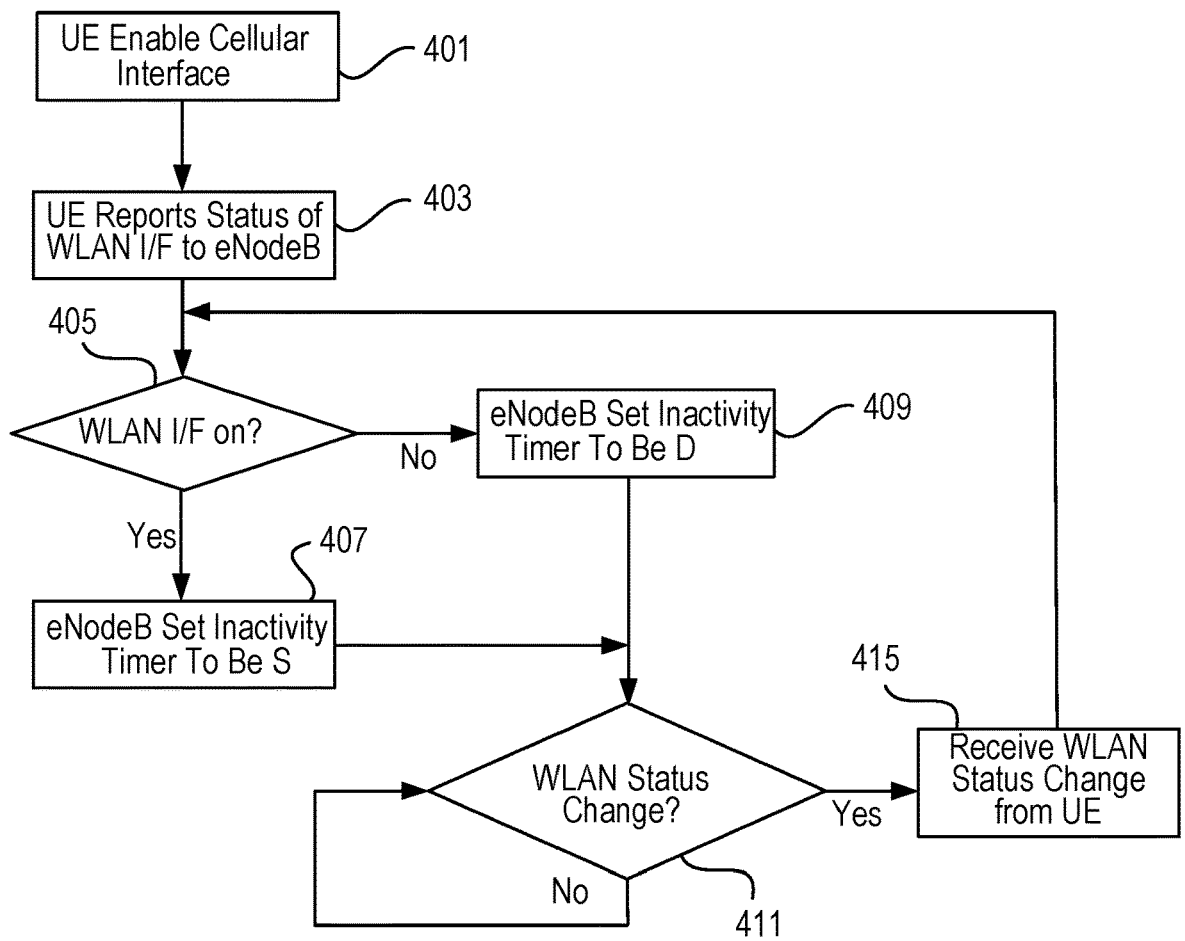
FIG. 4 illustrates an example flow diagram for implementing an embodiment with a mobile device and LTE base station.

FIG. 4 illustrates an example flow diagram for implementing an embodiment with mobile device 303 and LTE base station 305 shown in FIG. 3. With reference to FIG. 4, at 401 the user equipment (UE) enables its cellular interface and in 403 the UE reports the status of its non-cellular radio (WLAN) interface to the eNodeB during its connection setup. The LTE base station, based on the reported status, determines if the WLAN interface is on or off in 405. If the WLAN interface is off in 405, the eNodeB sets the inactivity timer for the UE to be a default value D, typically around 10-20 seconds. If the WLAN interface is on, the eNodeB sets the inactivity timer for the cellular radio interface of the UE to be a small value S, e.g., 100 milliseconds. Thus, the LTE base station sets the inactivity timer for a cellular radio interface of the UE based on the status of the co-existing UE WLAN interface in 407 and 409 and proceeds to wait for a WLAN status to change in 411. In an embodiment, the UE monitors the status of its WLAN interface in 411 and reports any status changes. If status does change, the eNodeB receives the status change report in 415 and returns to 405 to change the inactivity timer according to the change in status. That is, if the WLAN interface is on, the eNodeB sets the inactivity timer to S and if the WLAN interface is off, the eNodeB sets the inactivity timer to D. The eNodeB then waits for any subsequent changes in 411. That same approach can also be applied to other non-cellular interfaces, such as Bluetooth or Bluetooth Low Energy, that are either already on or can be activated upon short notice with low energy consumption.

Embodiments described herein are compatible and complementary to the existing 3GPP standard. In one embodiment an eNodeB maintains two values for the inactivity timer, the default value D and the small value S. Before a cellular interface of a UE sets up the RRC connection with its associated eNodeB, the UE checks whether the WLAN interface is turned on or not. If the WLAN interface is determined to be off, the UE can use an unmodified RRC connection setup procedure or utilize bits in the signaling messages during RRC connection setup to indicate the WLAN interface is off. The eNodeB responds to the notification that the WLAN interface is off in the UE by setting the inactivity timer to be the default value D. Otherwise, if the WLAN interface is on, the UE notifies the eNodeB that its WLAN interface is on. The eNodeB responds to the notification that the WLAN interface is on in the UE by setting the inactivity timer to be the small value S for this cellular radio, instead of using the default value.

In an embodiment, a signaling message during RRC connection setup may incorporate a field to notify the eNodeB about the WLAN interface status. For example, reserved bits can be used in the UE Capacity Information message or a new information element can be added in the UE Capacity Information message. After the cellular radio in the UE enters into the RRC_CONNECTED state, whether through the unmodified or enhanced procedure, the UE keeps monitoring the status of the WLAN interface in 501 and 503. If the WLAN interface is turned on or off the cellular interface reports this change to its associated eNodeB in 505, which then adjusts the inactivity timer as follows. If the inactivity timer is the small value S and the WLAN interface is turned off, the eNodeB resets the timer to the default value. If the inactivity timer uses the default value and the WLAN interface is turned on, the eNodeB sets the timer to be the small value S. Similarly, reserved bits or a new information element in the Measurement Report message can be used to convey the WLAN interface changes to the eNodeB.

Figure 6:
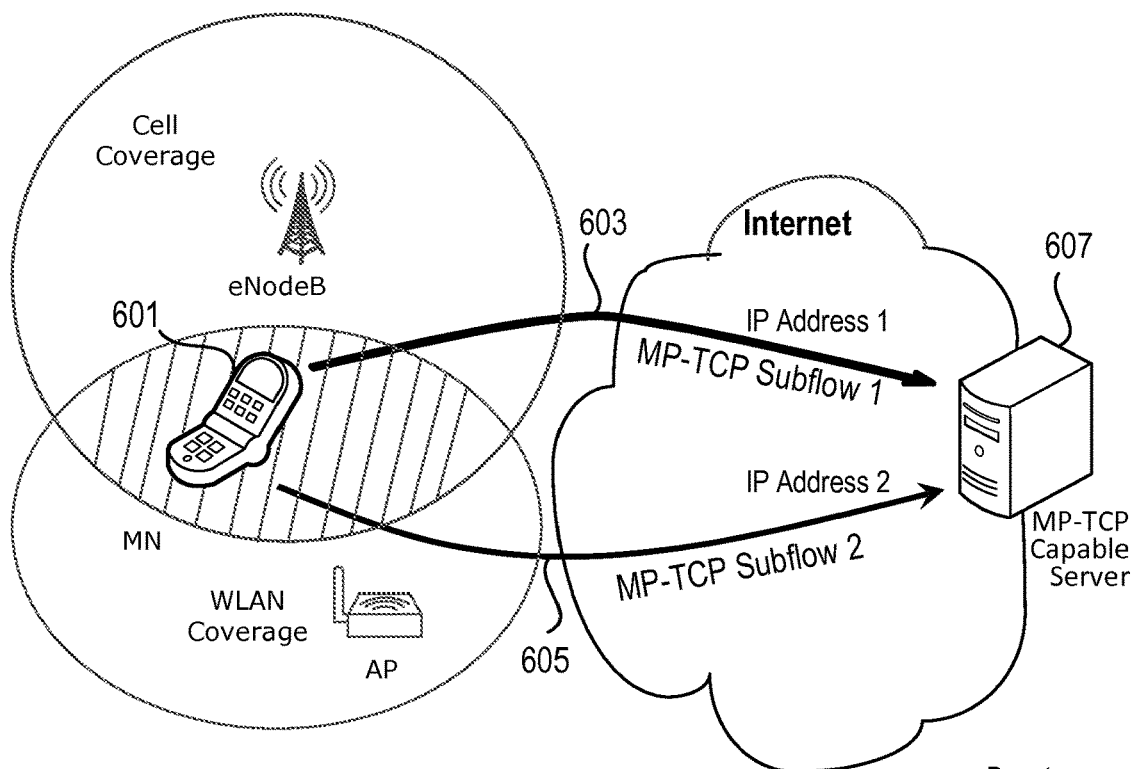
FIG. 6 illustrates a system utilizing the MultiPath Transfer Control Protocol (TCP) (MPTCP) in which an MPTCP server can be utilized to provide status information of the cellular and non-cellular interfaces of the mobile device.

Other embodiments use a server-based approach when MultiPath Transfer Control Protocol (TCP) (MPTCP) is used for communications and a proxy-based solution when a WLAN interface is used for cellular traffic offloading. MPTCP has recently been standardized by Internet Engineering Task Force (IETF), which allows a TCP connection to use multiple paths. Referring to FIG. 6, after an MPTCP connection is initiated over a mobile device 601 primary interface (e.g., cellular) and the first sub-flow 603 is established, a mobile device can establish another sub-flow 605 over the secondary interface (e.g., WLAN) with the remote server 607 by sending another TCP SYN packet with a JOIN option, which is defined as an extension in the MPTCP protocol. Similarly, when an interface is turned off, the REMOVE ADDRESS option is sent over the remaining sub-flow.

Figure 7:
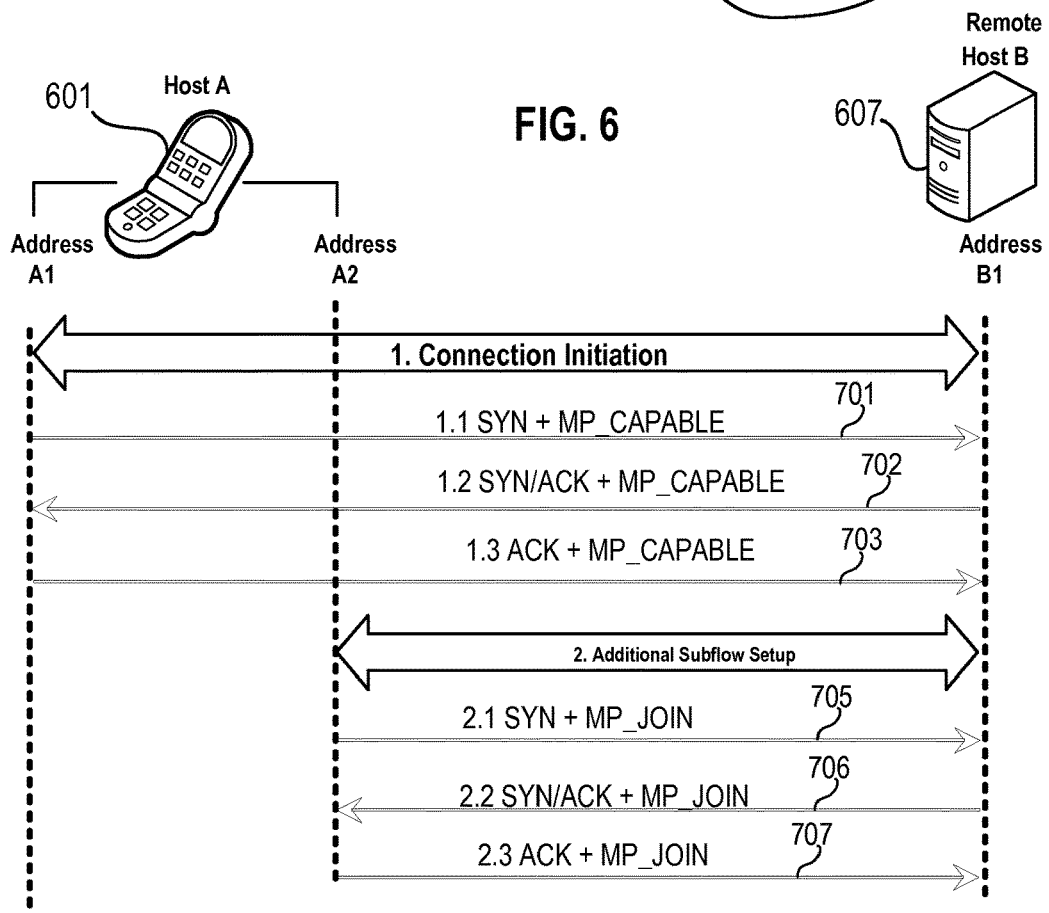
FIG. 7 illustrates control plane overview for connection initiation and additional subflow set up in an MPTCP environment.

FIG. 7 illustrates a control plane overview for connection initiation and additional subflow set up between Host A, e.g., mobile device 601 and remote Host B e.g., remote server 607. The signaling for starting the first subflow 603 of MPTCP between IP address A1 of host A to IP address B1 of remote host B is similar to the standard TCP (3-way handshake), except a MP_CAPABLE message 701 is included in the TCP option to test whether the remote host supports MPTCP. If the remote host is not MPTCP capable, or if the path does not support the MPTCP option (e.g., a network middlebox strips the "unknown" TCP option), the connection will fall back to standard TCP. Otherwise, the remote host response at 702 includes MP_CAPABLE in the SYN/ACK packet. The connection initiation concludes with an acknowledgement at 703.

If Host A has another IP address A2 that can be used, host A can initiate a new subflow similar to the first subflow. An MP_JOIN message is included in the TCP option shown at 705, and is used to authenticate and identify which MPTCP connection it is joining. At 706 the remote host B acknowledges and the additional subflow set up concludes at 707 to establish a new subflow using a second IP address A2 for host A and the same IP address B1 for remote host B. Alternatively, Host A may want to advertise (using ADD_ADDR in TCP option) to the remote host the availability of an address without establishing a new subflow. Then the remote Host B may later initiate a subflow to this address. Note that MPTCP operations (e.g. MP_CAPABLE, MP_JOIN, ADD_ADDR, REMOVE_ADDR, etc.) are signaled within TCP Option Header Kind #30.

Figure 8:
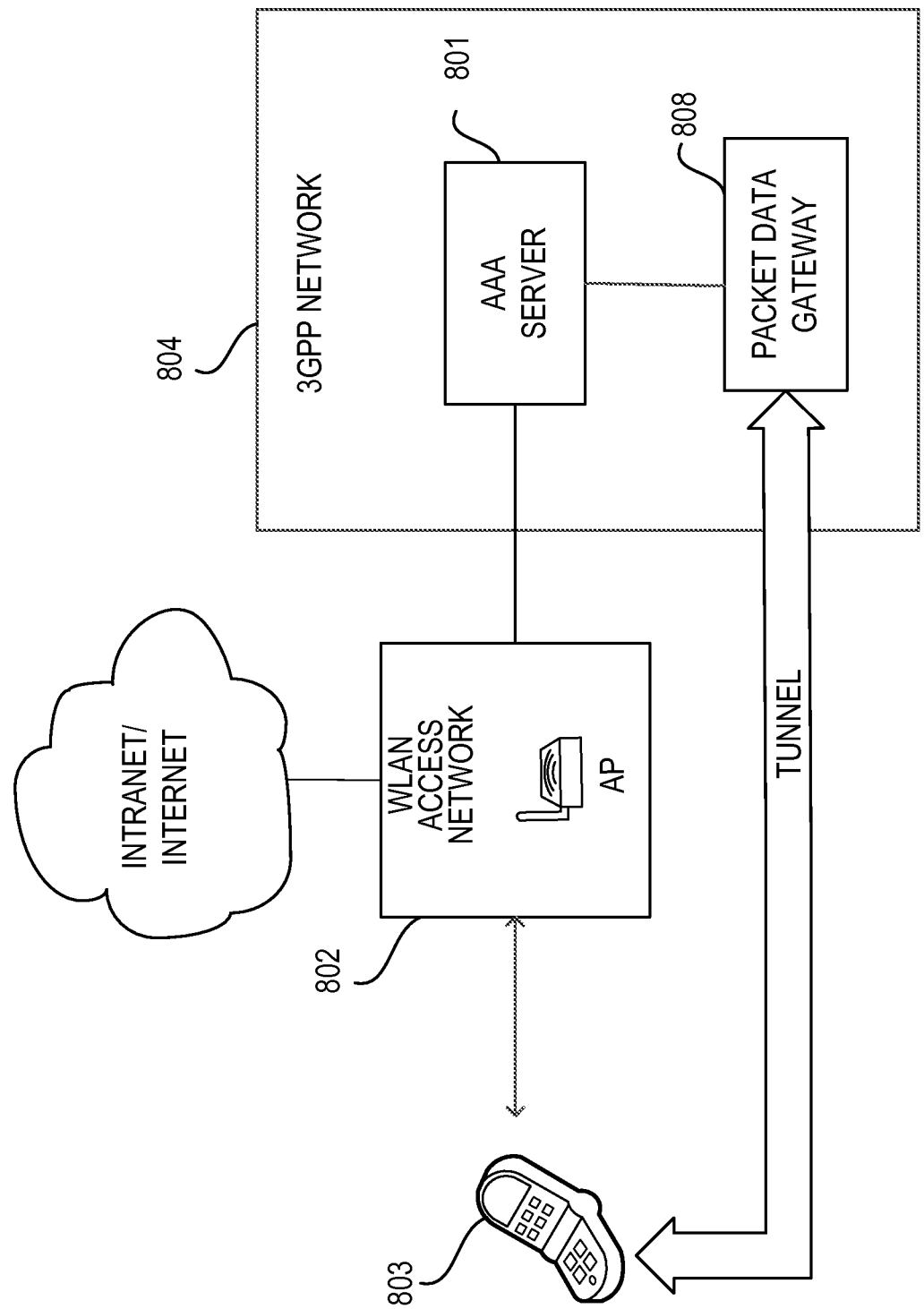
FIG. 8 illustrates a system in which an Authentication, Authorization, and Accounting (AAA) server supplies status information to the eNodeB of the cellular and non-cellular interfaces of the mobile device.

In order to offload data traffic from cellular networks, 3GPP has developed the standard for the interworking of a 3GPP system with a Wireless Local Area Network (WLAN) (3GPP TS 23.234). Referring to FIG. 8, which shows WLAN access network 802 as well as portions of 3GPP network 804, the UE 803 sets up a tunnel 805 to a Packet Data Gateway (PGW) 808 for the data plane through the WLAN access network. The UE 803 also set up another connection to the AAA (Authentication, Authorization, and Accounting) server 801 for control signaling. The AAA server 801 may not be connected to the PGW directly. The 3GPP WLAN attach status maintained by the AAA server 801 indicates whether the WLAN UE 803 is now being served by the 3GPP-WLAN Interworking System. The status could be either WLAN-attached after successful authentication and authorization or WLAN-detached network after its disconnection. As a result, the AAA server 801 knows whether a WLAN interface on a mobile device is turned on or not. The AAA server also has the status information of a given cellular radio interface.

Figure 9:
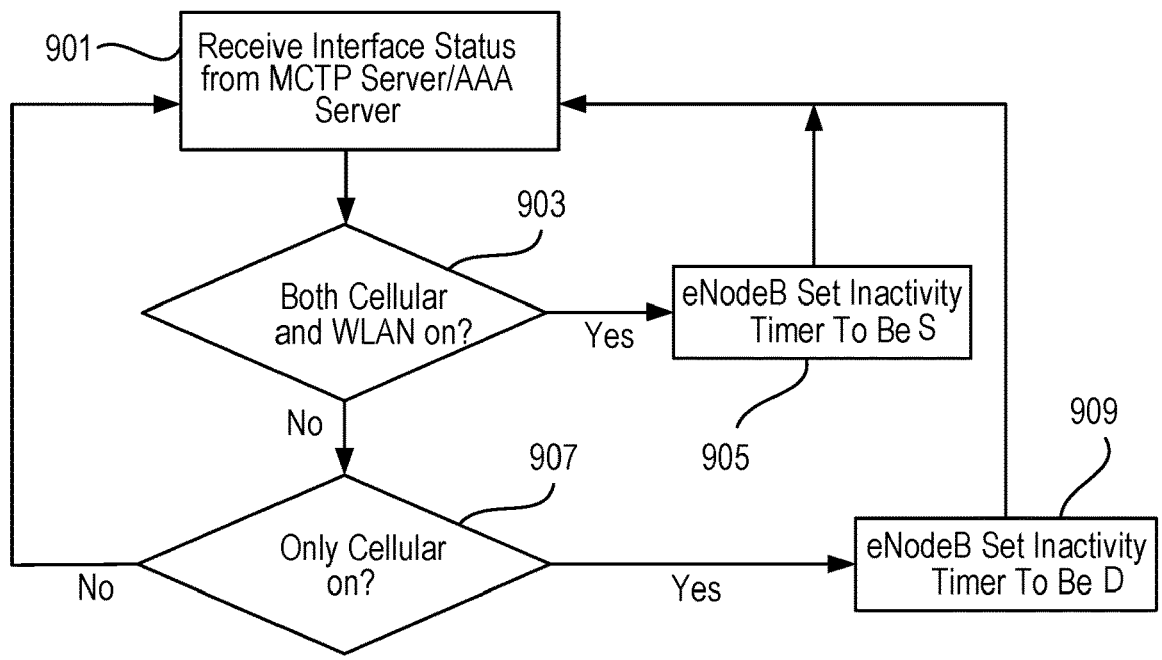
FIG. 9 illustrates a flow diagram of operation of an eNodeB receiving status information from an MPTCP server or an AAA server.

In both cases, either the MPTCP server 607 or the AAA server 801 knows the status of both cellular and WLAN interfaces on mobile devices and can notify the eNodeB to which the cellular interface is attached as to how to adjust the inactivity timer. FIG. 9 illustrates the operation of an eNodeB when the remote server/AAA server reports interface status. As shown in FIG. 9, eNodeB receive status information on the cellular and non-cellular interfaces of the mobile device being served by the eNodeB from the MPTCP server/AAA server in 901. If the status is, or changes to both the cellular and WLAN interfaces being on in 903, the eNodeB sets the inactivity timer to be the small value S in 905. If the status is, or changes to only the cellular interface being turned on in 907, the eNodeB uses the default value D for the inactivity timer in 909. Therefore, unlike the UE-based solution, the MPTCP server/AAA server based approach requires no modification on mobile devices or to the RRC connection setup procedure.

Figure 10:
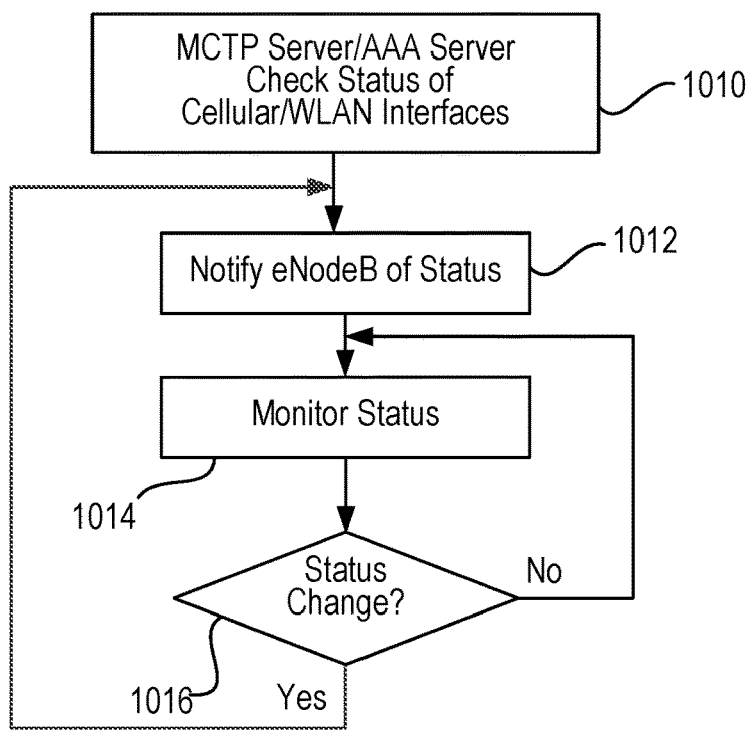
FIG. 10 illustrates a flow diagram of operation of an MPTCP server or an AAA server sending status to an eNodeB.

FIG. 10 illustrates operation of the MPTCP server/AAA server. As shown in FIG. 10, the MPTCP server/AAA server initially determines the status of the wireless interfaces on a mobile device in 1010 and reports the status to eNodeB in 1012. The MPTCP server/AAA server monitors for any change in status in 1014. If there is a status change in 1016 the change is reported to eNodeB in 1012. Various approaches may be used to report status or change in status. For example, approaches such as Femto Cell Application Programming Interface (API) or the traditional Operating System Support (OSS)/Business Support Systems (BSS) may be used to communicate status to the eNodeB either directly or indirectly. If there is no status change, the MPTCP server/AAA server continues to monitor the wireless interface status in 1014 until the connection is over. The MPTCP server/AAA server may implement the functionality shown in FIG. 10 in software stored in server memory (not shown separately) and utilize communication protocols well known in the art to communicate status to the eNodeB.

For both UE-based and MPTCP server/AAA server -based solutions, to avoid burdening an eNodeB with numerous WLAN status updates, a filtering mechanism can be added for reporting WLAN status changes because that may occur quite frequently, especially when a user is moving around. The filter can be based on either the moving speed of a user or a threshold for the number of WLAN status changes during the past several minutes. Thus, the UE first checks if the speed of the UE, based e.g., on location information from a global positioning system (GPS) function in the UE, exceeds a threshold, and if so, filters the reports. The filter may cause the reporting to stop until the speed of the UE reduces below a threshold speed and/or reduce the number of reports to no more than one per time period. For example reports may be filtered if the moving speed is higher than one meter per second (walking speed). For the MPTCP server/AAA server based solution, a reporting filter may be used to ensure the frequency of reports stays below, e.g., a threshold of no more than two reports per ten seconds.

Note that in the examples given herein the status of only one non-cellular interface has been described as being used to set the inactivity timer. In other embodiments, the status of multiple non-cellular interfaces may be tracked and reported to the base station and the base station may adjust the inactivity timer based on the status of multiple non-cellular interfaces. Thus, if one or more of multiple non-cellular interfaces are active, then the inactivity timer may be set to the small value S and if none of the multiple non-cellular interfaces are active, then inactivity timer may be set to the default value D.

Figure 11:
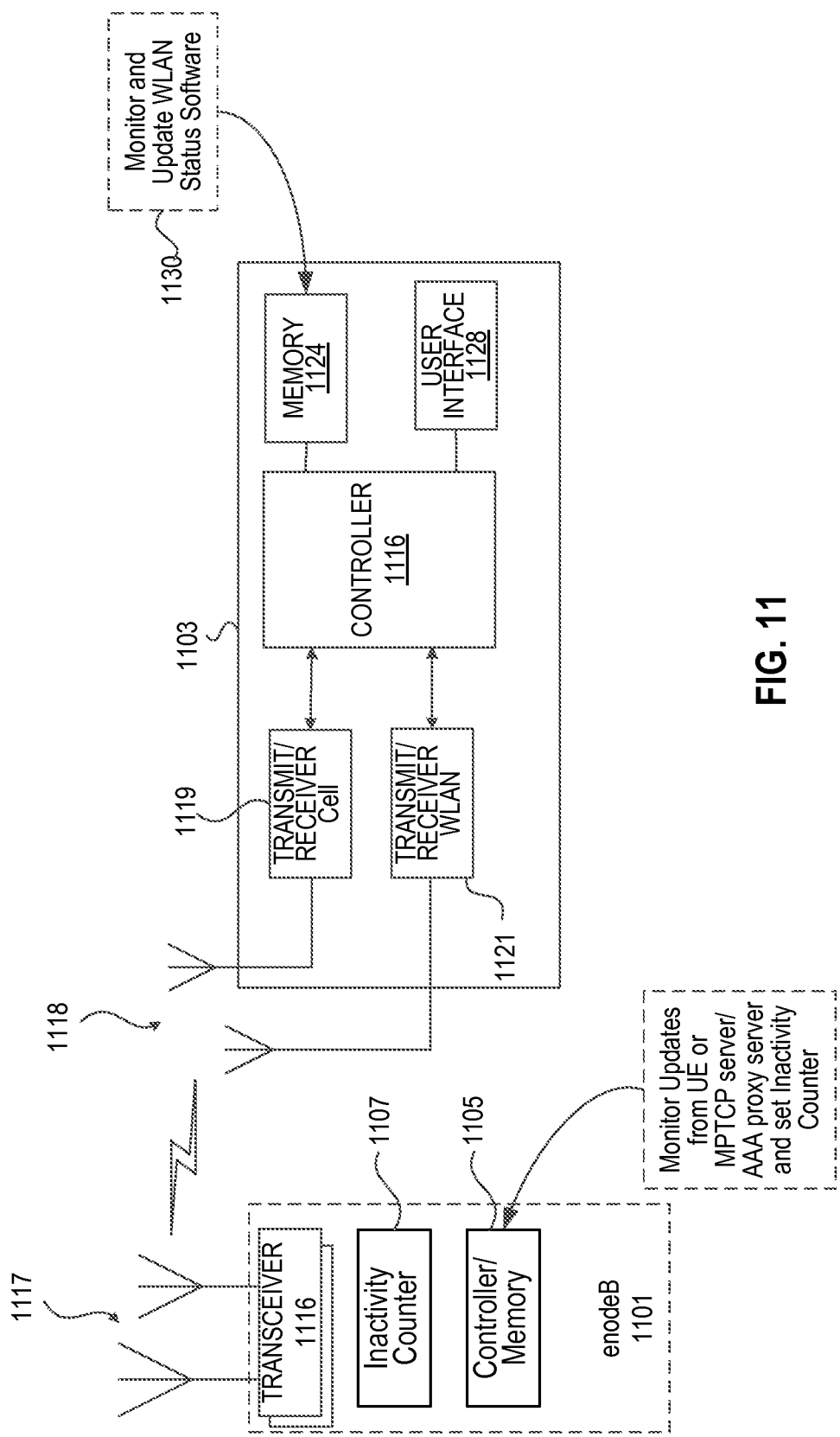
FIG. 11 illustrates high level block diagrams of the cell site and mobile device.

FIG. 11 illustrates high level block diagrams of the cell site base station and mobile device shown, e.g., in FIG. 3. The exemplary wireless system includes an eNodeB 1101 having one or more cellular antenna transceivers 1116 and antennas 1117 in communication with the mobile device 1103 with one or more antennas 1118. The eNodeB is representative of the cell site electronics necessary to achieve the radio communications according to the protocols in place for the particular radio network. The eNodeB and its associated electronics, computer control, antenna arrays and software to operate in accordance with appropriate telecommunications protocols (e.g., modulation, multiplexing, signal processing etc.) are well known in the art although functionality of some of those components have been modified or enhanced as described herein in order to accommodate aspects of the various embodiments described herein such as setting the inactivity timer 1107. For example, the controller/memory 1105 may be modified to update the inactivity timer 1107 in accordance with various embodiments described herein. The eNodeB is assumed to communicate in one or more of various cellular wireless technologies, e.g., LTE, to the mobile devices. However, other communication protocols may also be used and various embodiments of the disclosure may be applicable to various other wireless communications.

The components of the exemplary mobile device 1103 are either generally known in the art or based on those generally known in the art, although functionally some of those components have been modified or enhanced as described herein with respect to the present disclosure. The mobile device 1103 may be a mobile phone, laptop, tablet, wearable device, be installed in an automobile or in any number of other configurations. The mobile device 1103 in the illustrated embodiment is shown to have capability to communicate in over cellular radio interface 1119 and a WLAN interface 1121. The mobile device 1103 includes a controller 1116, such as a processor, microcontroller or similar data processing device that executes program instructions stored in a memory 1124. Typical transmitter functions including coding, mapping, and modulation are known in the art and are therefore not shown in any detail. Typical receiver functions, which are well known in the art and therefore not shown in any detail, include, e.g., intermediate frequency to baseband conversion, demodulation, constellation demapping, decoding, and/or descrambling according to the particular RF protocols and technology being employed. The receiver functions may be implemented in various combinations of analog and digital logic. In particular, the transmit and receiver functions may use digital signal processing and controller 1116 represents the necessary digital signal processing capability to implement necessary digital signal processing functions, even though one or more separate digital signal processors may be provided in mobile device 1103.

The memory 1124 may be implemented using any appropriate combination of alterable, volatile or non-volatile memory or non-alterable, or fixed memory. The alterable memory, whether volatile or non-volatile, may be implemented using any one or more of static or dynamic RAM, a floppy disk and disk drive, a writable or re-writable optical disk and disk drive, a hard drive, flash memory or other alterable memory components known in the art. Similarly, the non-alterable or fixed memory may be implemented using any one or more of ROM, PROM, EPROM, EEPROM, an optical ROM disk, such as a CD-ROM or DVD-ROM disk, and disk drive or other non-alterable memory known in the art.

The controller 1116 may be implemented as a single special purpose integrated circuit (e.g., ASIC) having a main or central processor unit for overall, system-level control, and separate sections dedicated to performing various specific computations, functions and other processes under the control of the central processor unit. The controller 1116 can also be implemented as a single microprocessor circuit, a digital signal processor (DSP), or a plurality of separate dedicated or programmable integrated or other electronic circuits or devices, e.g., hardwired electronic or logic circuits such as discrete element circuits or programmable logic devices. The controller 1116 may also include other circuitry or components, such as memory devices, relays, mechanical linkages, communications devices, drivers and other ancillary functionality to affect desired control and/or input/output functions.

Figure 5:
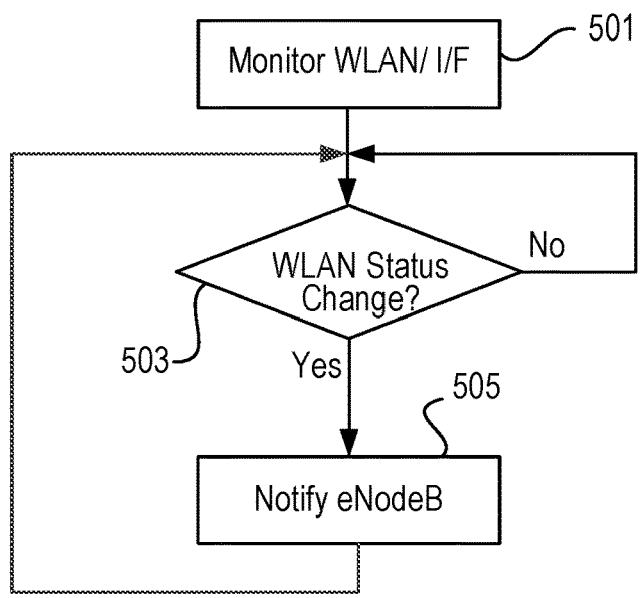
FIG. 5 illustrates a flow diagram for an embodiment from the perspective of the mobile device.

The controller 1116 is operatively coupled with user interface 1128. The user interface 1128 may include items known in the art, such as a display, keypad, speaker, microphone, and other user interface I/O components. In one embodiment the controller 1116 provides functionality to report the status of the WLAN interface when the cellular interface is enabled and monitor the status of the WLAN interface and report changes to the eNodeB over the cellular interface as described in FIGS. 4 and 5. In the illustrated embodiment the controller utilizes software functionality 1130 stored in memory 1124 to implement at least a portion of the monitor and update logic necessary to achieve the monitoring and updating associated with monitoring and reporting functionality as described herein.

Thus, aspects of inactivity timer have been described. The description set forth herein is illustrative, and is not intended to limit the scope of the following claims. Variations and modifications of the embodiments disclosed herein may be made based on the description set forth herein, without departing from the scope of the following claims.

What is claimed is:

1. A method comprising:
a base station setting an inactivity timer for a mobile device having a cellular radio interface and a non-cellular radio interface based on a status of the non-cellular radio interface in the mobile device;
the base station setting the inactivity timer to a first value responsive to the status of the non-cellular radio interface indicating the non-cellular radio interface is turned off; and
the base station setting the inactivity timer to a second value, smaller than the first value, responsive to the status of the non-cellular radio interface indicating the non-cellular radio interface is turned on;
wherein the inactivity timer determines how long the mobile device remains in a connected state after a communication between the base station and the mobile device ends.

2. The method as recited in claim 1, further comprising:
receiving the status at connection setup of the mobile device; and
while the mobile device is in the connected state, the base station adjusting the inactivity timer responsive to a change in the status of the non-cellular radio interface reported in a measurement report message from the mobile device.

3. The method as recited in claim 2, further comprising the base station receiving the change in the status of the non-cellular radio interface during the connected state.

4. The method as recited in claim 2, further comprising adjusting the inactivity timer to the first value from the second value if the change in the status of the non-cellular radio interface indicates the non-cellular radio interface has been turned off and setting the inactivity timer to the second value responsive to the change in the status of the non-cellular radio interface indicating the non-cellular radio interface has been turned on.

5. The method as recited in claim 2, further comprising:
the base station receiving the change of the status in the non-cellular radio interface from a multi-path Transmission Control Protocol (MPTCP) server.

6. The method as recited in claim 2, further comprising:
the base station receiving the change of the status in the non-cellular radio interface from an authentication, authorization, and accounting server.

7. The method as recited in claim 2, further comprising:
filtering reporting of the change of the status in the non-cellular radio interface responsive to a moving speed of the mobile device exceeding a threshold, to thereby reduce the reporting responsive to the moving speed exceeding the threshold.

8. The method as recited in claim 2, further comprising:
filtering reporting of the change of the status in the non-cellular radio interface responsive to a threshold number of changes in the status of the non-cellular radio interface.

9. The method as recited in claim 2, further comprising:
filtering reporting of the change of the status in the non-cellular radio interface to limit a frequency of the reporting to below a threshold number of reports.

10. The method as recited in claim 1, further comprising the base station communicating to the mobile device to enter a lower power state than the connected state responsive to an end of a time period indicated by the inactivity timer.

11. The method as recited in claim 1, further comprising the base station receiving the status of the non-cellular radio interface during an RRC connection setup.

12. The method as recited in claim 1, further comprising the mobile device monitoring changes in the status of the non-cellular radio interface during the connected state and reporting changes in the status of the non-cellular radio interface to the base station.

13. The method as recited in claim 1, further comprising:
the base station receiving a change in a status of the non-cellular radio interface from a multi-path Transmission Control Protocol (MPTCP) server;
the base station adjusting the inactivity timer responsive to the change of the status of the non-cellular radio interface; and
filtering reporting of the change of the status in the non-cellular radio interface to limit a frequency of the reporting to below a threshold number of reports.

14. The method as recited in claim 1, further comprising:
the base station receiving a change in a status of the non-cellular radio interface from an authentication, authorization, and accounting (AAA) server;
the base station adjusting the inactivity timer responsive to the change in the status of non-cellular radio interface; and
the AAA server filtering reporting of the change in the status of the non-cellular radio interface to limit a frequency of the reporting to below a threshold number of reports.

15. The method as recited in claim 1 further comprising:
the base station setting the inactivity timer to the first value response to the status indicating that all of a plurality of non-cellular radio interfaces are turned off, the plurality of non-cellular radio interfaces including the non-cellular radio interface; and
the base station setting the inactivity timer to the second value response to the status indicating that one or more of the plurality of non-cellular radio interfaces is turned on.

16. A system comprising:
a base station including,
an inactivity timer for a mobile device, wherein the inactivity timer determines how long the mobile device remains in a connected state after a communication between the base station and the mobile device ends; and
control logic responsive to a status of a non-cellular radio interface in the mobile device having a cellular radio interface and the non-cellular radio interface, to set the inactivity timer to a first value responsive to the status of the non-cellular radio interface indicating the non-cellular radio interface is turned off and to set the inactivity timer to a second value, smaller than the first value, responsive to the status of the non-cellular radio interface indicating the non-cellular radio interface is turned on; and
wherein the control logic is responsive to a change in status of the non-cellular radio interface indicating the non-cellular radio interface has been turned off to set the inactivity timer to the first value from the second value and the control logic is responsive to the change in the status of the non-cellular radio interface indicating the non-cellular radio interface has been turned on to set the inactivity timer to the second value;
wherein the mobile device is configured to send status updates regarding whether the non-cellular radio interface is turned on or off to the base station in response to a change in the status of the non-cellular radio interface, and wherein the mobile device is configured to reduce a number of the status updates sent responsive to a moving speed of the mobile device exceeding a threshold.

17. A system comprising:

a base station including,
- an inactivity timer for a mobile device, wherein the inactivity timer determines how long the mobile device remains in a connected state after a communication between the base station and the mobile device ends; and
- control logic responsive to a status of a non-cellular radio interface in the mobile device having a cellular radio interface and the non-cellular radio interface, to set the inactivity timer to a first value responsive to the status of the non-cellular radio interface indicating the non-cellular radio interface is turned off and to set the inactivity timer to a second value, smaller than the first value, responsive to the status of the non-cellular radio interface indicating the non-cellular radio interface is turned on; and
- wherein the control logic is responsive to a change in status of the non-cellular radio interface indicating the non-cellular radio interface has been turned off to set the inactivity timer to the first value from the second value and the control logic is responsive if the change in the status of the non-cellular radio interface indicating the non-cellular radio interface has been turned on to set the inactivity timer to the second value;

a multi-path Transmission Control Protocol (MPTCP) server or an authentication, authorization, and accounting (AAA) server communicatively coupled to the base station to send the change of the status of the non-cellular radio interface to the base station.

18. The system as recited in claim 17 wherein the MPTCP server or the AAA server is configured to limit a frequency of reporting the change in status to below a threshold number of reports per time period.

* * * * *